(12) United States Patent
Giering et al.

(10) Patent No.: US 9,447,544 B2
(45) Date of Patent: *Sep. 20, 2016

(54) SECURITY FEATURE HAVING SEVERAL COMPONENTS

(71) Applicant: GIESECKE & DEVRIENT GMBH, Munich (DE)

(72) Inventors: Thomas Giering, Kirchseeon (DE); Johann Kecht, Munich (DE); Stephan Steinlein, Munich (DE)

(73) Assignee: Giesecke & Devrient GmbHβ, Munich (DE)

( * ) Notice: Subject to any disclaimer, the term of this patent is extended or adjusted under 35 U.S.C. 154(b) by 142 days.

This patent is subject to a terminal disclaimer.

(21) Appl. No.: 14/364,747

(22) PCT Filed: Dec. 18, 2012

(86) PCT No.: PCT/EP2012/005240
§ 371 (c)(1),
(2) Date: Jun. 12, 2014

(87) PCT Pub. No.: WO2013/091842
PCT Pub. Date: Jun. 27, 2013

(65) Prior Publication Data
US 2014/0306442 A1  Oct. 16, 2014

(30) Foreign Application Priority Data

Dec. 23, 2011  (DE) .................. 10 2011 122 243

(51) Int. Cl.
| | |
|---|---|
| C09D 5/22 | (2006.01) |
| D21H 21/48 | (2006.01) |
| B41M 3/14 | (2006.01) |

(Continued)

(52) U.S. Cl.
CPC .......... *D21H 21/48* (2013.01); *B42D 15/0013* (2013.01); *C09D 5/22* (2013.01); *B41M 3/144* (2013.01); *B42D 25/29* (2014.10)

(58) Field of Classification Search
CPC ...... C09K 11/025; C09D 5/22; B41M 3/144; B42D 25/36; B42D 25/382
See application file for complete search history.

(56) References Cited

U.S. PATENT DOCUMENTS

| | | |
|---|---|---|
| 3,980,887 A | 9/1976 | Mattis et al. |
| 3,981,819 A | 9/1976 | Yocom et al. |

(Continued)

FOREIGN PATENT DOCUMENTS

| | | |
|---|---|---|
| DE | 3048734 A1 | 7/1982 |
| DE | 19804021 A1 | 8/1999 |

(Continued)

OTHER PUBLICATIONS

International Search Report from corresponding International PCT Application No. PCT/EP2012/005240, May 29, 2013.

(Continued)

*Primary Examiner* — Carol M Koslow
(74) *Attorney, Agent, or Firm* — Workman Nydegger

(57) ABSTRACT

The invention relates to a security feature having a luminescent component and a component camouflaging the luminescent component. The invention starts out from a security feature having a luminescent component having at least one luminophore consisting of a doped host lattice, and a component camouflaging the luminescent component, in which the camouflaging component has at least two substances, the first substance of the camouflaging component having an X-ray diffractogram which hides the X-ray diffractogram of the luminescent component, and the second substance of the camouflaging component having at least one cationic element of the luminescent component and at least one cationic element of the first substance of the camouflaging component, with the luminescent component and the first substance of the camouflaging component being formed of different cationic elements.

16 Claims, 2 Drawing Sheets

(51) Int. Cl.
*B42D 15/00* (2006.01)
*B42D 25/29* (2014.01)

(56) References Cited

U.S. PATENT DOCUMENTS

| | | |
|---|---|---|
| 4,014,812 A | 3/1977 | Kelsey, Jr. et al. |
| 4,452,843 A | 6/1984 | Kaule et al. |
| 4,463,970 A | 8/1984 | Kaule et al. |
| 6,344,261 B1 | 2/2002 | Kaule et al. |
| 6,802,992 B1 | 10/2004 | Wieczoreck et al. |
| 8,663,820 B2 | 3/2014 | Giering et al. |
| 2004/0105962 A1 | 6/2004 | Giering et al. |

FOREIGN PATENT DOCUMENTS

| | | |
|---|---|---|
| DE | 10056462 A1 | 5/2002 |
| DE | 10111116 A1 | 9/2002 |
| EP | 0966504 B1 | 11/2005 |
| WO | 81/03507 A1 | 12/1981 |
| WO | 2006/047621 A1 | 5/2006 |
| WO | 2011/084663 A2 | 7/2011 |

OTHER PUBLICATIONS

International Preliminary Report on Patentability from corresponding International PCT Application No. PCT/EP2012/005240, Jun. 24, 2014.

SECURITY FEATURE HAVING SEVERAL COMPONENTS

BACKGROUND

This invention relates to a security feature having a luminescent component and a component camouflaging the luminescent component.

The designation "value document" is to be understood within the framework of the invention to refer to bank notes, checks, shares, tokens, identity cards, credit cards, passports and also other documents as well as labels, seals, packages or other elements for product authentication.

Securing value documents against forgery by means of security features having a luminescent component has been known for a long time. The luminescent component is formed here by substances which will hereinafter also be designated luminophores and are formed by host lattices doped with transition metals or rare earth metals as luminescent ions. Such ions have the advantage that, after being suitably excited, they show one or more characteristic narrow-band luminescences which facilitate a reliable detection and the delimitation over other spectra. For doping, combinations of transition metals and/or rare earth metals have also been discussed. Such substances have the advantage that, in addition to the above-mentioned luminescences, one observes so-called energy transfer processes, which can lead to more complicated emission spectra. In such energy transfer processes, one ion can transfer its energy to another ion and the spectra can then consist of several narrow-band lines which are characteristic of both ions.

The stated security features for securing value documents have as a luminescent component individual luminophores whose emissions differ with regard to their spectral and/or temporal properties. The security features are incorporated into and/or applied to value documents in different forms of use. There can also be employed for the luminescent component a combination of luminophores. The emission bands of the employed luminophores constitute a spectral coding. Several different luminophores can be combined into systems, with the individual systems being independent of each other. The emission of the employed luminophores is also designated luminescence, whereby this may involve fluorescence and/or phosphorescence.

It is also known that the described security features are not formed solely by the luminescent component. As a further component, some security elements have a component that is used for camouflaging the luminescent component. For example, DE 30 48 734 A1 describes a security paper having camouflage substances protecting the authentication features. The camouflage substances of the camouflaging components correspond here substantially to the luminescent components, i.e. very similar or like-kind host lattices and dopants are employed for both the luminescent component and the camouflaging component. However, when manufacturing the camouflage substances for the camouflaging component it is made sure that the camouflage substances have no luminescent properties. For this purpose, parameters in the annealing or grinding process are for example changed for the camouflaging component in contrast to the manufacture of the luminescent component. Alternatively, so-called luminescence killers are employed. This prevents the luminescent component from being distinguished from the camouflaging component using conventional methods of analysis technology. By this means, primarily the position of the luminescent component is concealed, since it cannot be distinguished from the camouflaging component using conventional methods.

Since the luminescent component and camouflaging component involve very similar or even the same substances, no camouflage of the substance-based identity of the luminescent component is obtained, since the employment of the camouflaging component increases the total examinable quantity of material of the security feature in the value document to be secured, thereby tending to facilitate rather than impede the analyzability of the security feature or the luminescent component.

Starting out from this prior art, the invention is based on the object of specifying a security feature having a luminescent component and a component camouflaging the luminescent component wherein the analysis of kind and doping of a host lattice employed for the luminescent component is to be prevented or at least substantially impeded. It is intended here that a camouflage of the luminescent component be obtained both with regard to an elemental analysis and with regard to a structural analysis. The identification of the luminescent component is also to be impeded in case the security feature is present in pure form prior to incorporation into value documents or by ashing of authentic value documents, and can then be examined by means of elemental analysis methods such as XRF (X-ray fluorescence analysis) or ICP-AES (inductively coupled plasma optical emission spectrometry) or structural analysis methods such as X-ray powder diffractometry.

SUMMARY

The invention starts out from a security feature having a luminescent component having at least one luminophore consisting of a doped host lattice, and a component camouflaging the luminescent component, in which the camouflaging component has at least two substances, the first substance of the camouflaging component having an X-ray diffractogram (i.e. an X-ray diffraction pattern) which hides the X-ray diffractogram of the luminescent component, and the second substance of the camouflaging component having at least one cationic element of the luminescent component and at least one cationic element of the first substance of the camouflaging component, with the luminescent component and the first substance of the camouflaging component being formed by different cationic elements.

The invention has the advantage that it is more easily possible to find a first substance for the camouflaging component for hiding the X-ray diffractogram of the luminescent component when different elements are employed for the first substance of the camouflaging component and for the luminescent component, because as a result a greater selection of substances is available for the first substance of the camouflaging component. This makes an especially good camouflage of the structure of the luminescent component possible, since an effective camouflage of the structure is only obtained in the case of different, partly overlapping X-ray diffractograms, but not in the case of complete or almost complete overlap of the X-ray diffractograms. The employment of the second substance of the camouflaging component which has both at least one cationic element of the luminescent component and at least one cationic element of the first substance of the camouflaging component allows an interlacing of the luminescent component with the first substance of the camouflaging component, thereby making it impossible to determine the single components and thus in particular the luminescent component, or at least substantially impeding such determination.

Further advantages of the present invention are to be found in the following description of embodiments with reference to figures.

BRIEF DESCRIPTION OF THE DRAWINGS

There are shown.

DETAILED DESCRIPTION OF VARIOUS EMBODIMENTS

Figure 1:
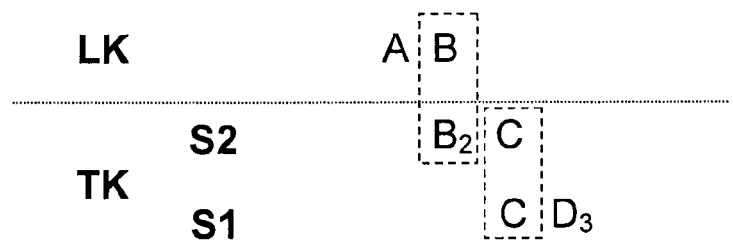
FIG. 1 a first embodiment of a security feature having a luminescent component and a component camouflaging the luminescent component, and FIG. 2 a second embodiment of a security feature having a luminescent component, a component camouflaging the luminescent component, a production component and a coding component, and FIG. 3 a third embodiment of a security feature having a luminescent component, a component camouflaging the luminescent component, a production component and a coding component.

Security features for securing or marking value documents having a luminescent component, on the basis of luminophores made of host lattices doped with transition metals or rare earth metals as luminescent ions and having specific properties in their emission and/or excitation, are known e.g. from WO 81/03507 A1, EP 0 966 504 B1, WO 2011/084663 A2, DE 198 04 021 A1 and DE 101 11 116 A1. Such security features are added either directly to the paper pulp in the form of a powder upon the manufacture of paper, or to other substrate materials of value documents, such as plastics. Alternatively or additionally, the powder is added to a printing ink which is then imprinted on the substrate of the value documents. The security feature can also be contained in other constituents of value documents, e.g. in threads, planchets, patches, etc., which are in turn incorporated into value documents or applied thereto.

The powdery security features having a luminescent component in the form of the above-mentioned luminophores moreover contain a component camouflaging the luminescent component. The camouflaging component is chosen here such that it leads to a hiding or camouflage of the luminescent component upon the structural and elemental analysis methods stated at the outset. For this purpose, the camouflaging component has for example an X-ray diffractogram that overlaps at least partly with the X-ray diffractogram of the luminescent component, as to be explained more precisely below.

For this purpose, there can be employed for the camouflaging component at least a first substance that does not have to be similar or the same in terms of substance relative to the substances used for the luminescent component, i.e. the luminescent component and the first substance of the camouflaging component do not have to have the same elements wholly or partly. Through the at least partial congruence of the X-ray diffractograms in significant peaks of luminescent component and first substance of the camouflaging component, it is therefore not possible, or at least only with substantial difficulty, to infer the luminescent component present in the security feature using common structural analysis methods such as X-ray powder diffractometry.

The goal of elemental analysis of the security feature is to obtain an inference about the identity of the employed host lattices through quantitative analysis of the constituents of the security feature. Methods such as e.g. XRF enable especially "difficult" elements to be readily detected. What is problematic, inter alia, is to quantify oxygen, which cannot be detected either by XRF or by ICP-AES or similar methods. Since oxygen usually forms the "remainder" of the matrix (e.g. as an oxide ion) after detection of the other constituents of the host lattice, however, its detection is not necessarily required for identifying the host lattice. When the cationic constituents of the host lattice have been quantified, the contained host lattices can be identified by forming the ratio of the constituents even in mixtures of different substances. Thus, for example, a mixture of $ZnAl_2O_4$ and $BaMnO_4$ always contains Zn and Al in a ratio of 1:2, and Ba and Mn always in a ratio of 1:1, independently of the mix ratio of the two elements. It is thus obvious to respectively assign these constituents to a host lattice, by which the latter can be identified.

To prevent or at least impede such a procedure, the respective components must be "interlaced", the term "interlace" being intended here to mean that all components or substances to be camouflaged respectively have at least pairwise at least one overlapping chemical element. The components/substances to be camouflaged that have pairwise overlapping elements involve at least the luminescent component as well as first substance and second substance of the camouflaging component. Additionally, further components/substances such as the production component and/or coding component can have elements overlapping with the other components/substances. The proportion of the respective chemical element must be present here in a sufficient order of magnitude to significantly distort the forming of a ratio from the elemental analysis. For example, in a mixture of $ZnMn_2O_4$ and $BaMnO_4$ no correct integral ratio will be found between the proportions of Zn and Mn or between Ba and Mn, since Mn is present in both host lattices forming the components or substances. Preferably, the detected quantitative proportion of the overlapping chemical element of a compound is elevated relative to the pure compound by at least 30%, preferably at least 50%, particularly preferably at least 100%. The quantitative proportion can also be elevated by at least 200%.

To obtain the "interlacing" of luminescent component and first substance of the camouflaging component, there is used in the camouflaging component at least a second substance which has both at least one element of the substance forming the luminescent component and at least one element of the first substance forming the camouflaging component, since the elements of the luminescent component and the elements of the first substance of the camouflaging component are different. An element is to be understood here as a chemical element which is contained both in the substance forming the luminescent component and in the second substance forming the camouflaging component. If the substance forming the luminescent component has for example the elements A and B, and the first substance of the camouflaging component the elements C and D, the second substance of the camouflaging component can have for example the elements A and C, A and D, B and C and/or B and D, where the elements A, B, C and D are not formed by oxygen or hydrogen. Besides the elements A, B, C and D, the substances can have further elements, in particular also oxygen and/or hydrogen. However, oxygen and hydrogen are not to be viewed as elements that effectuate an interlacing of the substances as intended by the present invention. Suitable elements are especially cationic matrix constituents, in particular cations of metals, transition metals, semimetals and rare earths. Element cations can, through the additional inclusion of oxygen, also form anionic sub-groups as matrix constituents which are likewise suitable for interlacing. Thus, for example, cations of phosphorus and of silicon can be present in a matrix e.g. in the form of phosphates and silicates. An interlacing of the substances as intended by the present invention can be formed by the main group elements Li, Be, B, Na, Mg, Al, Si, P, S, K, Ca, Ga, Ge, As, Se, Rb, Sr, In, Sn, Sb, Te, Cs, Ba, Tl, Pb, Bi, and by arbitrary elements of the transition metals and rare earths.

The above-described elements or chemical elements as intended by this invention are therefore alternatively also designated cationic elements, cationic matrix constituents, cationic constituents of the host lattice, or element cations. This is supposed to clearly express that in particular the chemical elements oxygen and/or hydrogen are not viewed as the chemical elements that effectuate an interlacing of the substances as intended by the present invention.

FIG. 1 represents by way of example a luminescent component LK consisting of one atom each of the elements A and B, a first substance S1 of a camouflaging component TK consisting of one atom of the element C and three atoms of the element D (i.e. $D_3$), and a second substance S2 of the camouflaging component TK consisting of two atoms of the element B (i.e. $B_2$) and one atom of the element C. Through the second substance S2 of the camouflaging component TK, which has with the element B a common element with the luminescent components LK, and with the element C a common element with the first substance S1 camouflaging the X-ray diffractogram of the luminescent component, the required "interlacing" of the components is obtained.

In the example of FIG. 1, it may hold that A=yttrium, B=aluminum, C=silicon, D=calcium. The luminescent component LK is then for example a rare earth-doped yttrium perovskite such as $YAlO_3$:Yb, which can be excited e.g. at 975 nm and emits in the region of 975 nm-1020 nm. The camouflaging component consists for example of a first substance S1 such as $Ca_3SiO_5$ and a second substance S2 such as $Al_2SiO_5$. The main peak in the diffractogram of the yttrium perovskite lies at 34.2° (all specifications as well as following specifications of peak positions being in degrees 2-theta). A significant peak (90% of the main peak) of $Ca_3SiO_5$ lies at 34.3°, thereby causing the X-ray diffractograms to partly overlap. Through the addition of $Al_2SiO_5$ neither the Y:Al ratio of 1:1 of the luminescent component nor the Ca:Si ratio of 3:1 of the first substance S1 of the camouflaging component is obtained upon elemental analysis of the mixture.

The security feature has 20% to 80% of the luminescent component, preferably 25% to 60%, particularly preferably 30% to 50% (all percentages as well as following percentages being by weight). The luminophore involved here is one emitting in the non-visible spectral region and consisting of a doped host lattice. Preferably, the luminophores possess high quantum yields or signal intensities and suitable decay times in order to guarantee error-free testability even with small quantities used in the value documents and at high moving speeds as occur for example in bank-note processing machines having a processing speed of up to 40 bank notes per second or more. Suitable luminophores for the luminescent component are for example inorganic crystalline matrices such as oxides, e.g. in the form of garnets, spinels or perovskites, as well as oxysulfides, sulfides, silicates, phosphates, aluminates, niobates, tantalates, vanadates, germanates, arsenates, zirconates or wolframates which are doped with rare earths and/or transition metals and possess decay times in the range between 50 µs and 10 ms.

The camouflaging component is contained in the security feature in a proportion of 20% to 80%, preferably 30% to 75%, particularly preferably 40% to 70%. Besides the camouflaging component, further, non-camouflaging components can also be contained in the security feature. The quantity used of the camouflaging component depends on, inter alia, the quantity and relative crystallinity of the luminescent component. This means that the relative intensity of the first substance of the camouflaging component in an X-ray diffractogram of the mixture of camouflaging component and luminescent component hides the latter sufficiently in the overlap regions. If the luminescent component shows only a low signal in the X-ray diffractogram e.g. due to a small grain size or a small proportion in the mixture, or if the camouflaging component has an especially high signal in the X-ray diffractogram due to its high crystallinity or suitable composition, less material of the camouflaging component must be used altogether to achieve the desired camouflage effect. To obtain a distortion of the X-ray diffractogram that is sufficient for camouflage, the camouflaging component causes in the overlapping region of the X-ray diffractogram of the luminescent component a relative change of the surface integral of an overlapping peak of the luminescent component of at least 20%, preferably at least 40%, particularly preferably at least 60%, very particularly preferably at least 80%. The camouflaging component can be formed by first substance and second substance, but additionally contain further substances which can likewise be interlaced elementally.

The camouflaging component must be added to the security feature here in such a quantity that upon X-ray powder diffractometry of the security feature the respective peaks of the camouflaging component and luminescent component are comparably strong. The X-ray diffractograms of the camouflaging component and luminescent component must not be identical or highly similar here, since this would not impede, but rather facilitate an analysis. The substances used should thus not be structurally related. However, it is likewise unfavorable when the peak positions of the two X-ray diffractograms show no match, since in this case it is especially easy to separate into the single components. Preferably, the camouflaging component is used in a form so that at least one, preferably two, particularly preferably three, relevant peak positions of the camouflaging component match corresponding peak positions of the luminescent component. "Match" is to be understood here to mean that the peak maxima of the two peaks of the luminescent component and camouflaging component differ at most by 1°, preferably at most by 0.5°, particularly preferably at most by 0.2° (2Θ). "Relevant" is to be understood here to mean that the peak is sufficiently strong to be important for identifying the substance. Preferably, the two to three overlapping peaks have at least 30%, particularly preferably at least 50%, of the height of the main peak. Particularly preferably, one of the matching peaks is a main peak or both main peaks of the substances forming the luminescent component and the camouflaging component. This partial overlap impedes an identification and separation of the individual X-ray diffractograms. This is the case particularly when the camouflaging component has at least one substance whose X-ray diffractogram is not commonly known, i.e. is not contained in common structure databases. Besides the structure type itself, it is likewise possible to obtain inferences about the element content or the degree of distribution of stoichiometric or non-stoichiometric mixed compounds from the relative height of individual peaks. For example, many structures can, when the elements are exchanged at certain crystal positions, form homogeneous mixed series with different elements which differ only little in structure, specifically in the dimensions of the unit cell, but can be identified by their different relative peak heights. Hence, as an additional advantage, even upon successful identification and separation of the individual X-ray diffractograms the local overlap conceals the exact relative ratio between individual peak heights, thereby substantially impeding inferences about the exact stoichiometry of the camouflaged matrices.

To obtain such a match of certain peak positions of the substances of luminescent component and camouflaging component, it may be necessary to specifically adapt the lattice constants of the substance of the camouflaging component. This is preferably done by partial substitution of a lattice component by a suitable proportion of atoms with a larger and/or smaller radius. In the structures of certain substances this makes it possible to obtain a continuous change of the lattice parameters, e.g. a widening of the lattice through insertion of atoms with a larger atomic radius, thereby in turn shifting the peak positions of the X-ray diffractogram. As a further advantage, the peak positions of such partly substituted substances are often present in common X-ray structure databases only for certain individual substitutional proportions, thereby further impeding an analysis. For example, for a substance $A_2SiO_4$ with a substitution of A by B there are often found the variants of complete substitution $B_2SiO_4$, half substitution $ABSiO_4$, and no substitution $A_2SiO_4$, but not arbitrary ratios, e.g. $A_{0.21}B_{1.79}SiO_4$. For example, the X-ray diffractograms of the isostructural compounds $Ba_2SiO_4$, $BaCaSiO_4$ and $Ca_2SiO_4$ are known. The positions of the two strongest XRD peaks here are respectively 29.4° and 30.4° for $Ba_2SiO_4$, 30.6° and 31.5° for $BaCaSiO_4$, and 32.0° and 32.5° for $Ca_2SiO_4$. However, arbitrary intermediate states can be produced in order to adapt the positions of the peaks. This makes it possible to improve the overlap of the X-ray diffractogram with the luminescent component. Simultaneously, finding the compound by utilizing X-ray structure databases is impeded.

Likewise, it is possible to strongly influence the relative intensity ratios of the individual peaks of an X-ray diffractogram by substitution with lighter and/or heavier atom types, even when their positions do not and only weakly change due to unvarying lattice parameters. In combination with the partial match of certain peaks of the mixture of substances of the luminescent and camouflaging components there can thus be generated an X-ray diffractogram that is especially hard to analyze.

In rare individual cases, first substance and second substance of the camouflaging component can be identical, that is, one substance has both an only partly overlapping X-ray diffractogram and partly common elements with the luminescent component. In such cases it is possible to represent the functionality of the camouflaging component by only one substance. The use of two different substances for the first substance and second substance of the camouflaging component is advantageous, however, and hence preferred. Firstly, finding an individual substance that satisfies both conditions is difficult and can hence only be done in rare cases or be poorly applied to a series of different security features. Additionally, a system having only one camouflaging component is of simpler structure and hence easier to decrypt.

Preferably, the luminescing component and the camouflaging component moreover possess the same or at least a similar density, so that they cannot easily be separated e.g. by sedimentation. Preferably, the deviation of the density of the camouflaging component from the density of the luminescent component amounts here to less than 50%, particularly preferably less than 30%.

Hereinafter, some examples of security features consisting of luminescent component and camouflaging component will be stated.

EXAMPLE 1

As a luminescent component there is used an Nd-doped calcium niobate $CaNb_2O_6$:Nd which was produced by annealing a mixture of 2.675 g $CaCO_3$, 7,234 g $Nb_2O_5$ and 0.092 g $Nd_2O_3$ for 10 h at 1150° C. Upon excitation at 532 nm the luminescent component emits at 1061 nm. The main peak in the X-ray diffractogram of the luminescent component lies here at 29.2°.

As a first substance of the camouflaging component there can be used monoclinic $Zr(MoO_4)_2$ whose main peak lies at 29.1°. As a second substance of the camouflaging component there can be employed $CaZrO_3$.

A security feature comprising luminescent component and camouflaging component then has for example the composition:
40% $CaNb_2O_6$:Nd
30% $CaZrO_3$
30% $Zr(MoO_4)_2$

EXAMPLE 2

As a luminescent component there is used a $KY_{0.95}Ho_{0.05}(WO_4)_2$ which was produced by annealing a mixture of 6.80 g $K_2WO_4$, 3.00 g $YCl_3.6H_2O$ and 0.198 g $HoCl_3.6H_2O$ for 6 h at 800° C. Upon excitation at 650 nm the luminescent component emits at 2014 nm.

The main peak in the diffractogram of the luminescent component lies here at 28.1°. As a first substance of the camouflaging component there can be used $CsSrLa(PO_4)_2$ whose main peak lies at 28.1°. As a second substance of the camouflaging component there can be employed $YPO_4$.

A security feature comprising luminescent component and camouflaging component then has for example the composition:
30% $KY_{0.95}Ho_{0.05}(WO_4)_2$
40% $CsSrLa(PO_4)_2$
30% $YPO_4$

EXAMPLE 3

As a luminescent component there is used a $Y_{1.98}Nd_{0.02}SiO_5$ which was produced by mixing 2.66 g urea, 0.53 g $SiO_2$, 6.72 g $Y(NO_3)_3.6H_2O$, 0.08 g $Nd(NO_3)_3.5H_2O$ and 3 mL $H_2O$, evaporating the liquid at 500° C., and annealing the obtained material at 1500° C. for 10 h. Upon excitation at 532 nm the luminescent component emits at 1075 nm.

A significant peak (>70% of main peak) in the diffractogram lies at 22.8°.

As a first substance of the camouflaging component there can be employed $NaTaO_3$ whose main peak lies at 22.8°. As a second substance of the camouflaging component there can be employed $YTaO_3$.

A security feature comprising luminescent component and camouflaging component then has for example the composition:
35% $Y_{1.98}Nd_{0.02}SiO_5$
30% $NaTaO_3$
35% $YTaO_3$

EXAMPLE 4

As a luminescent component there is used a $KTiO(PO_4)$:Er which was produced by annealing a mixture of 18.78 g $KH_2PO_4$, 10.90 g $TiO_2$ and 0.61 g $Er_2O_3$ at 800° C. for 12 h.

Upon excitation at 520 nm the luminescent component emits at 1540 nm. The main peak in the diffractogram of the luminescent component lies at 32.3°, with a closely adjacent significant peak (>70% of the main peak) at 32.6°. As a first substance of the camouflaging component there can be used $LaMnO_3$ which possesses two significant peaks (90-100% of the main peak) at 32.3° and 32.6° in the diffractogram. As a second substance of the camouflaging component there can be employed $LaPO_4$.

A security feature comprising luminescent component and camouflaging component then has for example the composition:
35% $KTiO(PO_4)$:Er
35% $LaMnO_3$
30% $LaPO_4$

EXAMPLE 5

As a luminescent component there is used a mixture of the luminophores $KTiO(PO_4)$:Er and $CaNb_2O_6$:Nd from the previous examples. The component $KTiO(PO_4)$:Er is to be camouflaged here. For this purpose, there can be employed, as in the previous example, $LaMnO_3$. Alternatively, $KTiO(PO_4)$:Er also possesses a significant peak (>80% of the main peak) at 28.8° as well as a significant peak (>30% of the main peak) at 25.9°. As a first substance of the camouflaging component there can be employed β-$BaSO_4$ which possesses two significant peaks (95-100% of the main peak) at 25.9 and 28.8° in the diffractogram. As a second substance of the camouflaging component there can be employed $BaTiO_3$.

A security feature comprising luminescent component and camouflaging component then has for example the composition:
20% $KTiO(PO_4)$:Er
15% $CaNb_2O_6$:Nd
35% β-$BaSO_4$
30% $BaTiO_3$ An alternative composition in which the elemental composition of the $CaNb_2O_6$:Nd is additionally camouflaged is:
20% $KTiO(PO_4)$:Er
15% $CaNb_2O_6$:Nd
25% β-$BaSO_4$
20% $BaTiO_3$
20% $CaTiO_3$ An alternative composition that camouflages both luminophores and contains $Ba_3(PO_4)_2$ and $LaNbO_3$ as second substances of the camouflaging component is for example:
20% $KTiO(PO_4)$:Er
15% $CaNb_2O_6$:Nd
20% β-$BaSO_4$
15% $CsSrLa(PO_4)_2$
15% $Ba_3(PO_4)_2$
15% $LaNbO_3$ By employing further components having different functionalities there can be achieved additional advantageous properties for the security feature, whereby an elevated security against imitation can additionally be obtained. The further components as well as the luminescent component and the camouflaging component can be mutually coordinated in their quantity and elemental composition as well as additionally in structural regard.

As a further component, a production component can be contained in the security feature. The security feature has 0-30%, preferably 0-20%, of the production component. The production component is employed in order to guarantee an unvarying quality or signal intensity of the security feature or of the luminescent component contained therein. Depending on manufacturing conditions such as the employed raw material batches and impurities contained therein, annealing parameters, grinding parameters, etc., there can occur an intensity fluctuation of the luminescence signal of the luminescent component. To compensate such fluctuations, the production component is added to the security element in a proportion in order to adjust the luminescence signal of the thus obtained security element to a specified nominal magnitude. This prevents the need, when using the security feature, to vary the respective metering when incorporating the security feature into value documents upon the above-described fluctuations. In contrast to the camouflaging component, the proportion of the production component is variable relative to the luminescent component, since the required proportion of the production component in the security feature depends on the respective production conditions, as described hereinabove.

It is not absolutely necessary, but preferred, that the production component involves a crystalline substance. In this case, it is further preferred that the peak positions of the X-ray diffractogram of the production component and of the camouflaging or luminescent component overlap at least partly in the above-described way. By this means, an X-ray analysis can be additionally impeded.

Moreover, it may be provided that a chemical analysis and separation of luminescent component, camouflaging component and production component is also prevented or at least impeded. For this purpose, the production component can have at least one element of the substance forming the luminescent component and/or at least one element of the substances forming the camouflaging component. Likewise, the production component can have a second substance which has at least one element of the first component of the production component and at least one element of the luminescent and/or camouflaging component. When the luminescent component and camouflaging component have for example the above-described elements A, B, C and D, the production component has at least one of the elements A, B, C or D. The production component can in addition have one or more further elements E, as well as oxygen and/or hydrogen.

When there are employed $YAlO_3$:Yb as a luminescent component, $Ca_3SiO_5$ as a first substance of the camouflaging component and $Al_2SiO_5$ as a second substance of the camouflaging component, as already described as an example, there can be employed as a production compensation for example a compound without an additional camouflage effect, e.g. titanium dioxide. However, it is preferable to use a compound having at least one element of the luminescent component or camouflaging component, e.g. $MgAl_2O_4$, since this additionally impedes an elemental analysis of the mixture. Alternatively, there can be used a compound such as $Mg_2SnO_4$ which possesses a main peak in the X-ray diffractogram at 34.4° and thus overlaps with the diffractogram of the luminescent component.

EXAMPLE 6

The luminescent component and camouflaging component are identical with Example 1. As a production compensation there is employed $CaCO_3$. A security feature comprising luminescent component, camouflaging component and production compensation then has for example the composition:
30% $CaNb_2O_6$:Nd
25% $CaZrO_3$
25% of $Zr(MoO_4)_2$
20% $CaCO_3$

EXAMPLE 7

The luminescent component and camouflaging component are identical with Example 2. As a production compensation there is employed $Ca_3(PO_4)_2$. A security feature comprising luminescent component, camouflaging component and production compensation then has for example the composition:
30% $KY_{0.95}Ho_{0.05}(WO_4)_2$
30% $CsSrLa(PO_4)_2$
25% $YPO_4$
15% $Ca_3(PO_4)_2$ A further component of the security feature can be formed by a coding component. The coding component is contained in the security feature in a proportion of 0-10%, preferably 0.5-5%, particularly preferably 1-3%. The coding component involves a substance which is employed as a forensic feature, by which e.g. different production batches, deliveries, manufacturers or processors can be marked. Preferably, the coding component is formed by a luminophore. However, the luminophore does not have to emit in the non-visible spectral region like the luminescent component, but can luminesce e.g. preferably in the visible spectral region. Since the coding component is designed as a forensic feature, it does not have to have the above-described properties for evaluation at high transport speed in bank-note processing machines. However, it should be made sure that the evaluation of the luminescent component is not adversely affected by the coding component. Preferably, the coding component hence differs as greatly as possible from the luminescent component in excitation and emission. The detection of the coding component can be effected via forensic methods, e.g. by the use of a fluorescence microscope or measurement by means of a special laboratory setup, whereby considerably longer measurement times (e.g. several minutes up to hours) in comparison to the luminescent component may also be necessary for reliable detection.

As a coding component there are preferably utilized collapsed zeolite structures loaded with rare earth metals and/or transition metals, as are described for example in DE 100 56 462 A1. These offer the advantage that zeolites can be loaded with a multiplicity of cations easily via ion exchange. It is likewise preferable to use matrices doped with rare earth metals and/or transition metals, which have narrow-band spectra in the vis region. Preferably, the dopants used here are the trivalent rare earth cations, luminescing in the vis region, of praseodymium, samarium, europium, terbium and dysprosium, and the matrices used are oxides, e.g. in the form of garnets, spinels or perovskites, as well as oxysulfides, sulfides, silicates, phosphates, aluminates, niobates, tantalates, vanadates, germanates, arsenates, zirconates or wolframates. Examples of such and further substances are described in the prints U.S. Pat. Nos. 3,980,887, 4,014,812, 3,981,819 and WO 2006/047621 A1. In addition to the excitation spectrum or emission spectrum, the life of the luminescence can also be tested. The proportion of rare earth ions and/or transition metals in the coding component can be so high here that it is comparable to the concentration of rare earth metals and/or transition metals of the dopants of the luminescent component upon elemental analysis of the security feature. This impedes identification of the dopants employed for the luminescent component. As explained hereinabove in connection with the other components, it is preferred that the doping of coding component and luminescent component is also effected with different elements, since otherwise a chemical analysis is not impeded, but rather facilitated. Also, further cations not involved in the luminescence can be embedded into the zeolite structure or the luminophore matrix material in order to influence the elemental composition of the coding component.

Rare earth metals and/or transition metals can be added not only to the coding component but also to the production component and/or the camouflaging component and/or other components, in order to additionally protect the dopant of the luminescent component. The quantities of rare earth metals and/or transition metals here are as described hereinabove in connection with the coding component, i.e. the quantity of added rare earth metals and/or transition metals is comparable to the quantity of the dopants of the luminescent component. Comparable is intended here to mean that the molar quantity of the addition amounts to at least 30% of the molar quantity of the dopant of the luminescent component. The rare earth metals can be firmly inserted into the lattice of the respective component here, or also, e.g. if a direct insertion into the matrix of the respective component proves to be technically disadvantageous or is difficult, preferably be admixed to the component as an additional separate substance. For example, the production component or another component can consist of a mixture of a substance without rare earth content and of a rare earth-containing substance. When a separate rare earth-containing substance is used, its proportion in the total mixture preferably amounts to 0.5-4%, particularly preferably 1-2%.

Besides the production and coding components, the security feature can have added thereto further functional components which likewise do not necessarily have to involve a camouflaging effect. Examples of such additional components are e.g. dyes for adapting the color of the security feature, luminescence absorbers which suppress unwanted visible fluorescences of the security feature, fluxing agents for adjusting the rheology of a powder forming the security feature, or pure additions of rare earth metal compounds and/or transition metal compounds for protecting the identity of the dopants used.

Figure 2:
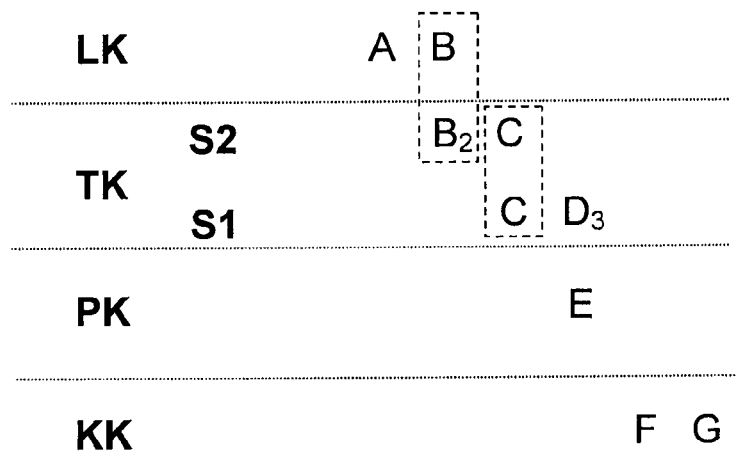
Figure 3:
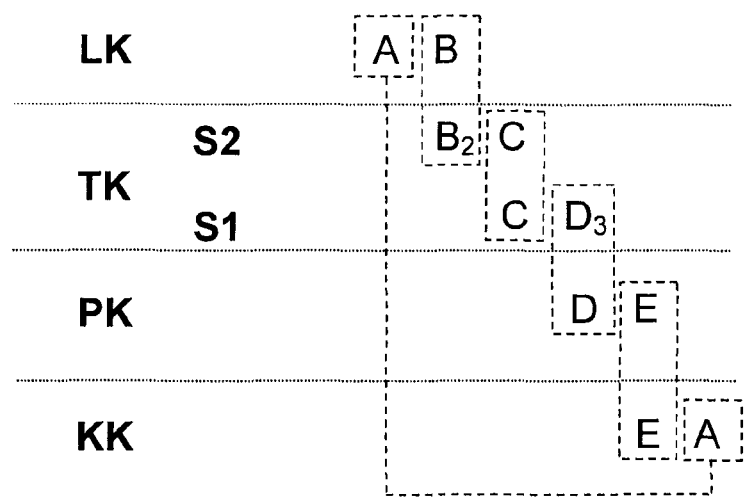

For a security feature having five different host lattices, formed from atoms of the non-oxygen elements A, B, C, D and E, an elemental interlacing only of the luminescing component and of the camouflaging component can be performed for example as in FIG. 2, and an elemental interlacing of all components be performed for example as in FIG. 3.

The security feature according to FIG. 2 with A=Y, B=Al, C=Si, D=Ca, E=Ti, F=Gd, G=B can consist e.g. of 35% luminescent component LK (e.g. $YAlO_3$:Yb), 45% camouflaging component TK, with 20% of the first substance S1 (e.g. $Ca_3SiO_5$) and 25% of the second substance S2 (e.g. $Al_2SiO_5$), 18% of the production component PK (e.g. $TiO_2$)

and 2% of the coding component KK (e.g. $GdBO_3$:Tb). Upon elemental analysis of this mixture and determination of the relative proportions of A, B, C, D and E it is not possible to find an inference about the identity of the luminescent component LK e.g. from the relative ratio of A to B, in the example the ratio of Y to Al. In the luminescent component the ratio of Y to Al amounts to exactly 1:1, but in the security-feature mixture containing the camouflaging component the molar ratio of Y to Al amounts to 1:3.3. When such a ratio is found upon an elemental analysis, it would not be apparent at first sight that Y and Al together form a matrix, and with this ratio one would likewise not expect yttrium aluminum perovskite as a luminescent component. An additional analysis by X-ray diffractometry would, due to the small proportion of material extractable from bank notes or material contained in bank-note ash, yield a diffractogram of very poor quality with a low signal-to-noise ratio and perhaps greatly broadened peaks, e.g. caused by damage to the crystal structures through the chemical treatment of extraction or the ashing process. Through the overlap of the diffractograms of $YAlO_3$ and $Ca_3SiO_5$ the diffractogram of $YAlO_3$ is concealed and falsified at relevant places, and will thus perhaps not even be recognized. However, it is for example also possible that at an overlap of the main peaks only e.g. $Ca_3SiO_5$ is perceived as a possible phase, since otherwise no further strong signal can be recognized. An identification of the luminescent component has thus been considerably impeded in comparison to the use of the pure substance.

The security feature according to FIG. 3 with A=Y, B=Al, C=Si, D=Ca, E=Ta can consist e.g. of 35% luminescent component LK (e.g. $YAlO_3$:Yb), 45% camouflaging component TK, with 20% of the first substance S1 (e.g. $Ca_3SiO_5$) and 20% of the second substance S2 (e.g. $Al_2SiO_5$), 18% of the production component PK (e.g. $Ca_2Ta_2O_7$) and 2% of the coding component KK (e.g. $YTaO_4$:Pr). Upon elemental analysis of this mixture and determination of the relative proportions of A, B, C, D and E it is, as in the example of FIG. 2, not possible to find an inference about the identity of the luminescent component LK e.g. from the relative ratio of A to B. Additionally, the first substance of the camouflaging component, $Ca_3SiO_5$, cannot be inferred from the Ca:Si ratio either, however, thereby resulting in an additional uncertainty upon the analysis here and additionally impeding a correct interpretation of the diffractogram. Likewise, the coding component cannot be isolated from the other components due to its small proportion in the total mixture alongside the considerably higher proportions of yttrium or tantalum, so that its existence or exact composition is "concealed" by the common elements of the other components.

EXAMPLE 8

The luminescent component and camouflaging component are identical with Example 3. As a production compensation there is employed $CaCO_3$. For camouflaging the dopants there are employed $Er_2O_3$ and $Dy_2O_3$. As a coding component there is employed $CaTa_2O_6$:$Sm_{0.03}$ (emission at 610 nm). A security feature comprising luminescent component, camouflaging component, production compensation and coding component then has for example the composition:
33% $Y_{1.98}Nd_{0.02}SiO_5$
25% $NaTaO_3$
25% $YTaO_3$
10% $CaCO_3$
5% $CaTa_2O_6$:$Sm_{0.03}$
1.5% $Er_2O_3$
0.5% $Dy_2O_3$

EXAMPLE 9

The luminescent component and camouflaging component are identical with Example 4. As a production compensation there is employed $Ca_3(PO_4)_2$. For camouflaging the dopants there is employed $Nd_2O_3$. As a coding component there is employed LaOBr:Tb (emission at 543 nm). A security feature comprising luminescent component, camouflaging component, production compensation and coding component then has for example the composition:
30% $KTiO(PO_4)$:Er
30% $LaMnO_3$
25% $LaPO_4$
12% $Ca_3(PO_4)_2$
2% LaOBr:Tb
1% $Nd_2O_3$ It is to be noted that the numbers of elements and relative stoichiometries of the compounds composed of the elements A-G as stated in FIGS. 1 to 3 represent only an example for describing the invention, and are not to have a limiting effect.

It is also possible that more than two components, or the substances employed therefor, possess the same elements, or that more than one element between two components or substances are the same.

Likewise, the luminescent component can have more than one luminescent substance, i.e. more than one luminophore. In this case, a first and a second substance in the camouflaging component are preferably provided for each luminophore of the luminescent component. If this is e.g. not possible for technical reasons or involves elevated effort, it may be sufficient to camouflage only a single luminophore of a luminophore combination, since all luminophores of a luminophore combination must usually be identified for successful imitation of the security feature. In such cases, only one of the several luminophores is preferably protected by a first and second substance of the camouflaging component.

If similar substances are employed for the luminophores, e.g. like-kind matrices with different dopants, it may be sufficient to provide only a first and a second substance in the camouflaging component for the similar substances of the luminescent component in order to obtain an interlacing of several luminophores in the above-described sense.

To sufficiently impede the analysis, it is preferred that the security feature consists of at least three, preferably four, particularly preferably five, different substances which all differ in the elemental constitution of their host lattices.

The security feature can be employed in the value documents for securing their authenticity and/or represent a coding of certain properties, for example of a currency and/or denomination, etc., if the value documents are bank notes.

The invention claimed is:

1. A security feature having a luminescent component having at least one luminophore consisting of a doped host lattice, and a component camouflaging the luminescent component, wherein the camouflaging component has at least two substances, the first substance of the camouflaging component having a X-ray diffractogram which hides the X-ray diffractogram of the luminescent component, and the second substance of the camouflaging component having at least one cationic element of the luminescent component and at least one cationic element of the first substance of the camouflaging component, with the luminescent component and the first substance of the camouflaging component being formed by different cationic elements, the X-ray diffractogram of the luminescent component and the X-ray diffractogram of the first substance of the camouflaging component being at least partially dissimilar, wherein the X-ray diffractogram of the luminescent component and the X-ray diffractogram of the first substance of the camouflaging component are partly overlapping.

2. The security feature according to claim 1, wherein the security feature has a production component, which is added to the security feature in a proportion for adjusting the signal intensity of the luminescence of the luminescent component to a specified nominal magnitude.

3. The security feature according to claim 2, wherein the production component has at least one chemical element, the chemical element being a constituent of at least one other component of the security feature.

4. The security feature according to claim 2, wherein the production component has at least two different chemical elements, the first of the two different chemical elements being a constituent of a first other component of the security feature, and the second of the two different chemical elements being a constituent of a second other component of the security feature.

5. The security feature according to claim 1, wherein the security feature has a coding component, for forensically marking the security feature.

6. The security feature according to claim 5, wherein the coding component has at least one chemical element, the chemical element being a constituent of at least one other component of the security feature.

7. The security feature according to claim 5, wherein the coding component is formed by a luminophore that differs from the luminescent component, the coding component having at least one chemical element that is shared with the luminescent component.

8. The security feature according to claim 1, wherein the X-ray diffractogram of the luminescent component and the X-ray diffractogram of the first substance of the camouflaging component are at least partially congruent, with at least one relevant peak position overlapping.

9. The security feature according to claim 8, wherein at least two of the relevant peak positions overlap, and wherein the at least two overlapping peaks have at least 30% of the height of a main peak.

10. The security feature according to claim 8, wherein the overlapping peaks are a main peak of luminescent component and first substance of the camouflaging component.

11. The security feature according to claim 1, wherein the components and substances are formed by inorganic host lattices or matrices.

12. The security feature according to claim 1, wherein the security feature contains 20% to 80% of the luminescent component, and that the security feature contains 20% to 80% of the camouflaging component, and that the security feature contains 0 to 30% of a production component, and that the security feature contains 0 to 10% of a coding component.

13. The security feature according to claim 1, wherein the luminescing component and the camouflaging component moreover have the same or a similar density, with the deviation of the density of the camouflaging component from the density of the luminescent component amounting to less than 50%.

14. A value document having a security feature according to claim 1, wherein the value document consists of paper and/or plastic.

15. The value document according to claim 14, wherein the security feature is incorporated into the volume of the value document.

16. The value document according to claim 14, wherein the security feature is printed to the value document as a coating.

* * * * *